UNITED STATES PATENT OFFICE.

WILLIAM THOMAS KENDRICK, OF MONTGOMERY, ALABAMA, FOR HIMSELF AND AS ADMINISTRATOR OF GEORGE W. DIXON, DECEASED.

PROCESS OF MAKING A DISINFECTANT.

SPECIFICATION forming part of Letters Patent No. 686,855, dated November 19, 1901.

Application filed January 10, 1901. Serial No. 42,820. (No specimens.)

*To all whom it may concern:*

Be it known that we, WILLIAM THOMAS KENDRICK, a citizen of the United States of America, and a resident of the city of Montgomery, county of Montgomery, and GEORGE W. DIXON, deceased, late a citizen of the United States of America, and a resident of Auburn, county of Lee, State of Alabama, have invented a new and useful Process of Making a Disinfectant, of which the following is a specification.

The objects of our invention are the prevention and cure of disease, the cleansing and healing of wounds in man, beast, and fowl, and for general antiseptic, disinfectant, and germicidal purposes.

Referring to the formula which forms a part of this specification, the remedy is manufactured from the following drugs and in the following manner: Chlorid of lime, carbonate of potassa, boracic acid, permanganate of potassa. Add slowly, stirring briskly, ten (10) pounds chlorid of lime to twelve (12) gallons of water. Let this mixture stand twelve hours and decant the clear liquid. Dissolve sixteen (16) pounds of carbonate of potassa in three (3) gallons of water by means of heat. Then mix thoroughly the solutions of chlorid of lime and carbonate of potassa. Let this stand until all precipitation ceases. Then draw off the supernatant clear fluid and add fifteen (15) grains of boracic acid and one-half (½) grain of permanganate of potassa to the ounce of this fluid. Dissolve well and allow to settle thoroughly. When all precipitation ceases, draw off and bottle for use. This makes a mild borochloro-manganate of lime, soda, and potassa. This compound has a beautiful royal-purple color, of chlorin odor, and a pungent and styptic taste.

We attach importance to our compound for the reason that we have so combined the leading antiseptics, disinfectants, germicides, cleansers, and healers that they may be used with safety and benefit externally, internally, and universally in the household, hospital, and stock-yard for the prevention and cure of disease, the cleansing and healing of wounds, &c., and that it may be used effectually in the garden, orchard, and vineyard for the destruction of all insect life that infests the plants and destroys vegetation and fruit. It may also be used in the dairy for the prevention of fermentation in milk, the refreshing of butter, &c., and that it may be used effectually for the prevention of contagion and infection from all causes, and, finally, that the compound meets a universal need of mankind.

We claim—

The process of compounding a liquid chemical composition for the purposes stated, comprising essentially chlorid of lime, carbonate of potassa, boracic acid, permanganate of potassa, in substantially the proportions specified, consisting in incorporating chlorid of lime in water, then permitting precipitation and decanting the supernatant fluid; then dissolving carbonate of potassa in water by means of heat, then mixing the solutions of chlorid of lime and carbonate of potassa and permitting the combined solution to stand until precipitation is complete; then removing the supernatant solution; then incorporating boracic acid and permanganate of potassa and permitting substantially complete precipitation, and then removing the supernatant from the residual fluid, substantially as set forth.

In witness whereof I have hereunto set my hand in the presence of two witnesses.

WILLIAM THOMAS KENDRICK,
*Joint inventor and administrator of the estate of Geo. W. Dixon, deceased.*

Witnesses:
M. A. KENDRICK,
M. N. DIXON.